(12) United States Patent
Yeh et al.

(10) Patent No.: US 9,774,625 B2
(45) Date of Patent: Sep. 26, 2017

(54) PHISHING DETECTION BY LOGIN PAGE CENSUS

(71) Applicant: Trend Micro Incorporated, Tokyo (JP)

(72) Inventors: Che-Fu Yeh, Taipei (TW); Wen-Kwang Tsao, Taipei (TW); Paul Lin, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 84 days.

(21) Appl. No.: 14/920,711

(22) Filed: Oct. 22, 2015

(65) Prior Publication Data
US 2017/0118243 A1    Apr. 27, 2017

(51) Int. Cl.
*H04L 29/06*    (2006.01)

(52) U.S. Cl.
CPC ...... *H04L 63/1483* (2013.01); *H04L 63/1416* (2013.01); *H04L 63/1425* (2013.01)

(58) Field of Classification Search
CPC ............ H04L 63/1483; H04L 63/1416; H04L 63/1425
See application file for complete search history.

(56) References Cited

U.S. PATENT DOCUMENTS

| 7,021,534 | B1 | 4/2006 | Kiliccote |
| 7,802,298 | B1 | 9/2010 | Hong et al. |
| 8,019,689 | B1 * | 9/2011 | Nachenberg ......... G06Q 10/063 705/50 |
| 8,776,196 | B1 | 7/2014 | Oliver et al. |
| 8,966,582 | B1 * | 2/2015 | Ainslie ................... H04L 63/14 726/2 |
| 2005/0160330 | A1 | 7/2005 | Embree et al. |
| 2006/0064374 | A1 | 3/2006 | Helsper et al. |
| 2006/0070126 | A1 | 3/2006 | Grynberg |
| 2006/0101120 | A1 | 5/2006 | Helsper et al. |
| 2006/0123464 | A1 | 6/2006 | Goodman et al. |
| 2006/0123478 | A1 | 6/2006 | Rehfuss et al. |
| 2006/0168066 | A1 | 7/2006 | Helsper et al. |
| 2006/0253583 | A1 * | 11/2006 | Dixon ................. H04L 63/1441 709/225 |
| 2007/0112814 | A1 | 5/2007 | Cheshire |
| 2007/0282739 | A1 | 12/2007 | Thomsen |
| 2008/0028444 | A1 | 1/2008 | Loesch et al. |
| 2008/0082662 | A1 | 4/2008 | Danliker et al. |
| 2008/0183745 | A1 * | 7/2008 | Cancel .................. G06Q 30/02 |

(Continued)

*Primary Examiner* — Robert Leung
(74) *Attorney, Agent, or Firm* — Okamoto & Benedicto LLP

(57) ABSTRACT

A system for detecting phishing includes a phishing detection system that generates census of login pages received in different computers of different end users. An end user computer receives a login page and retrieves census information of the login page, such as from the phishing detection system. The census information indicates a number of different end users who employed the login page to log into their respective online accounts. The end user computer reports the census information to the end user of the end user computer. The end user computer reports the census information in numerical, graphical, or other format. The census information of the login page allows the end user to make an informed decision on whether or not to use the login page.

20 Claims, 6 Drawing Sheets

(56) References Cited

U.S. PATENT DOCUMENTS

| | | | |
|---|---|---|---|
| 2009/0006532 A1* | 1/2009 | Sinn | H04L 12/585 |
| | | | 709/203 |
| 2014/0173730 A1* | 6/2014 | Bejerasco | G06F 21/50 |
| | | | 726/22 |
| 2015/0067832 A1* | 3/2015 | Sastry | G06F 21/552 |
| | | | 726/22 |

\* cited by examiner

PHISHING DETECTION BY LOGIN PAGE CENSUS

BACKGROUND OF THE INVENTION

1. Field of the Invention

The present invention relates generally to computer security, and more particularly but not exclusively to methods and systems for combating phishing.

2. Description of the Background Art

Various online services are available over the Internet. Examples of these online services include online banking, data storage, webmail, social networks, etc. Generally speaking, an online service may be accessed with appropriate credentials, such as a user identifier (e.g., username, email address, mobile phone number) and a password. An end user may obtain credentials upon creation of an online account with the online service. The online service may maintain a website that serves a webpage for entering credentials, referred to as a "login page." The login page may include a login form, such as that shown in FIG. 2. A login page may simply have the login form, or include other data.

Unfortunately, the convenience provided by online services not only attracts legitimate end users but fraudsters as well. Fraudsters may gain access to an online account of a victim using a variety of techniques including by "phishing." Phishing is a kind of social engineering that involves some form of misrepresentation. A fraudster may operate a malicious website or hijack a legitimate website to serve a login phishing page, which is a webpage that mimics the look and feel of a legitimate login page for the purpose of stealing the victim's credentials. The fraudster may direct the victim to the login phishing page by spam email, man-in-the-middle attack, etc. The login phishing page is made to look convincingly real to trick the victim into entering his credentials.

SUMMARY

In one embodiment, a system for detecting phishing includes a phishing detection system that generates census of login pages received in different computers of different end users. An end user computer receives a login page and retrieves census information of the login page, such as from the phishing detection system. The census information indicates a number of different end users who employed the login page to log into their respective online accounts. The end user computer reports the census information to the end user of the end user computer. The end user computer reports the census information in numerical, graphical, or other format. The census information of the login page allows the end user to make an informed decision on whether or not to use the login page.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
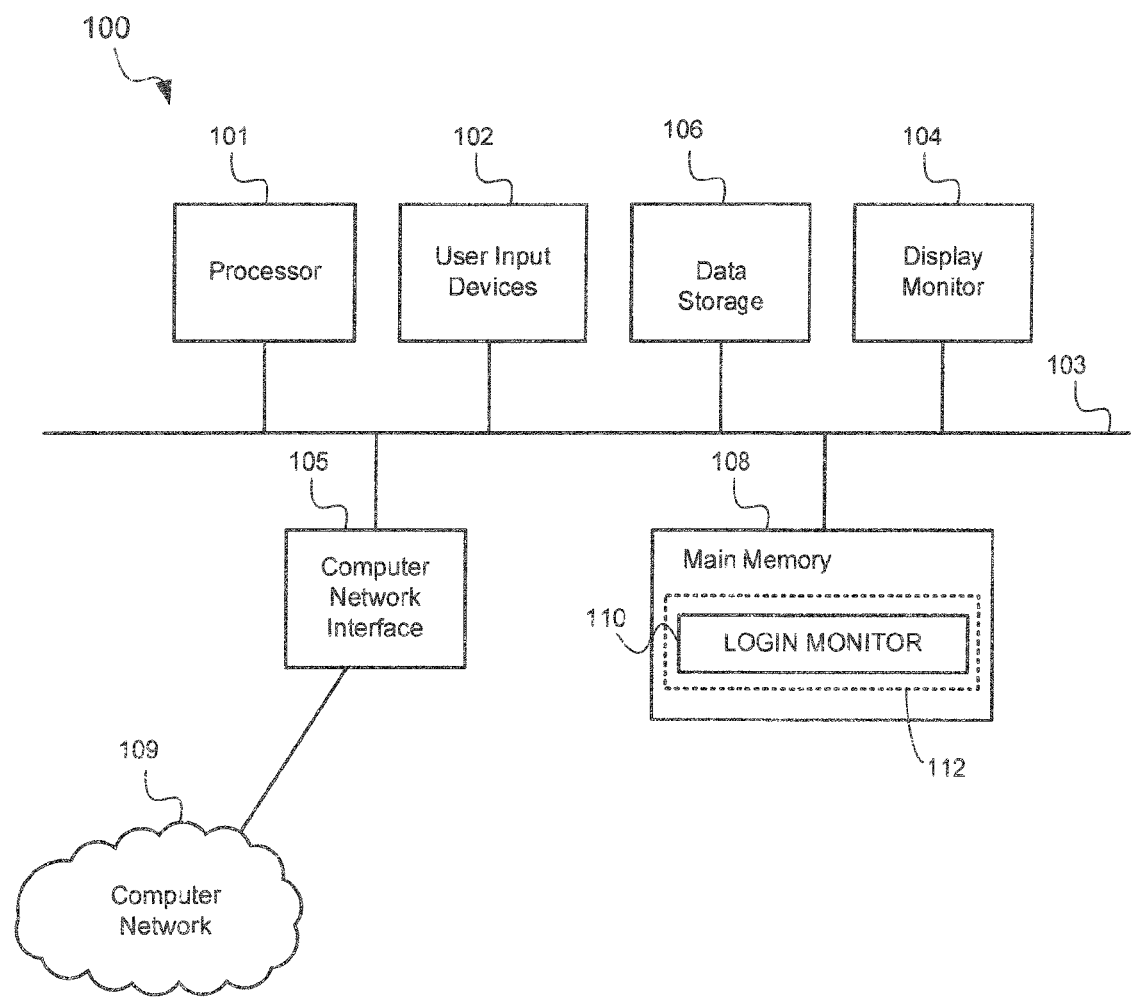
FIG. 1 shows a schematic diagram of a computer system in accordance with an embodiment of the present invention.
Figure 2:
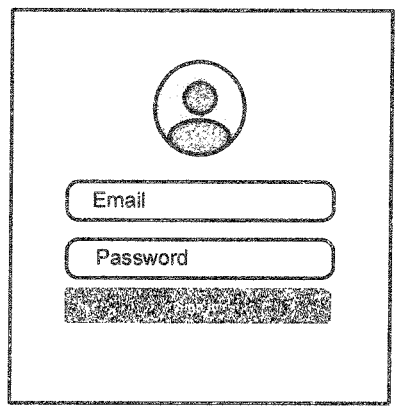
FIG. 2 shows an example login form of a login page.

Referring now to FIG. 1, there is shown a schematic diagram of a computer system 100 in accordance with an embodiment of the present invention. The computer system 100 may be employed as an end user computer or other computers described below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules comprising instructions stored non-transitory in the main memory 108 for execution by a processor 101. An article of manufacture may be embodied as computer-readable storage medium including instructions that when executed by a processor 101 of the computer system 100 causes the computer system 100 to be operable to perform the functions of the one or more software modules. In the example of FIG. 1, the software modules comprise a login monitor 110 when the computer system 100 is employed as an end user computer. The login monitor 110 may be implemented in multiple modules or as a stand-alone module. In some embodiments, the login monitor 110 is implemented as a module of or integrated in a computer security module 112, which may comprise a computer security product (e.g., antivirus).

Figure 3:
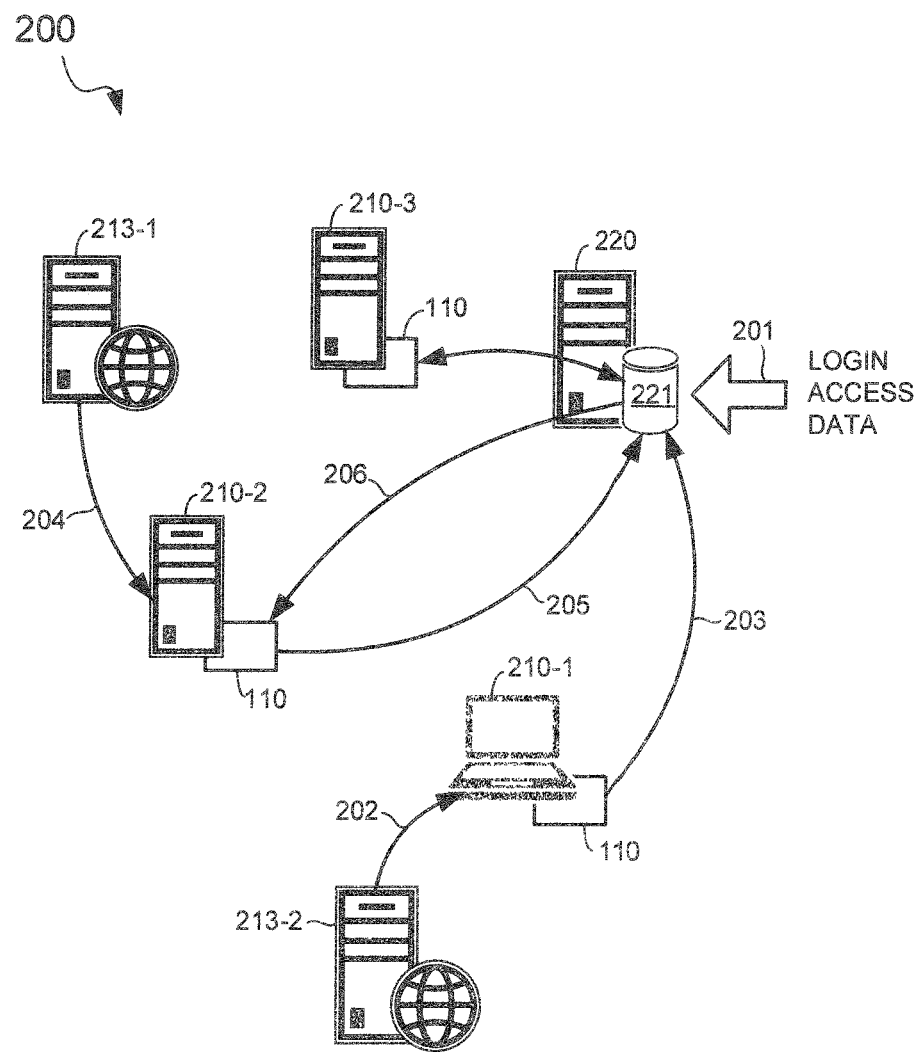
FIG. 3 shows a schematic diagram of a system for detecting phishing in accordance with an embodiment of the present invention.

FIG. 3 shows a schematic diagram of a system 200 for detecting phishing in accordance with an embodiment of the present invention. In the example of FIG. 3, the system 200 is configured to allow end users to detect a login phishing page. In the example of FIG. 3, the system 200 comprises a phishing detection system 220 and a plurality of end user computers 210 (i.e., 210-1, 210-2, 210-3 etc.). The phishing detection system 220 and the end user computers 210 may communicate over the Internet. In the example of FIG. 3, the end user computers 210 may communicate with a plurality of websites 213 (i.e., 213-1, 213-2, etc.) also over the Internet.

The phishing detection system 220 may comprise one or more computers that generate a census of login pages. The phishing detection system 220 may receive login access data from an external feed (see arrow 201), such as from logs of content delivery systems, computer security vendors, participating networks, manual submissions, etc. The login access data may comprise an identifier (ID) of a login page (e.g., a hash of the login page), the network location of the login page (e.g., uniform resource locator (URL)), the geographic location of an end user who logged into his online account using the login page, the timestamp of when the end user logged in using the login page, and/or other data regarding the login page. The phishing detection system 220 may also receive login access data from an end user computer 210. For example, an end user computer 210-1 may receive a login page from a web server 213-2 (see arrow 202). A login monitor 110 running on the end user computer 210-1 may detect the reception of the login page in the end user computer 210-1, generate access data for the login page, and provide the login access data to the phishing detection system 220 (see arrow 203).

In the example of FIG. 3, the phishing detection system 220 generates a census of login pages from the collected login access data. For example, the phishing detection system 220 may generate a count of how many times a login page has been received in different computers and used by different end users to login to an online account. The phishing detection system 220 may also generate other census information for the login page, such as the geographical locations of end users who logged in using the login page, the timestamp of when end users logged in using the login page, and other information that can be tallied or derived from collected login access data. The phishing detection system 220 may store the census of login pages in a census data store 221, such as a database. The phishing detection system 220 may service requests for census information of a particular login page by consulting the census data store 221.

In the example of FIG. 3, an end user computer 210 may comprise a laptop, a desktop, or other computer employed by an end user to login to an online account. An end user computer 210 may be running a login monitor 110. In one embodiment, the login monitor 110 monitors for reception of a login page in the end user computer 210. A login page may be identified from its password and/or user ID input fields, page identifier (e.g., hash), or other characteristics indicative of a login page. Logging into an online account may be detected when the password field and user ID input field of the login page are populated and the enter key is pressed or a sign-in button is clicked, for example. A login monitor 110 may detect reception of a login page in an end user computer 210 (see arrow 204) and, in response, send the phishing detection system 220 a request for census information of the login page (see arrow 205). The phishing detection system 220 may consult the census data store 221 and provide the requested census information to the login monitor 110 (see arrow 206). As can be appreciated, the census information of a login page may be a null, i.e., no information, which is the case when the phishing detection system 220 has not previously received login access data for the login page.

In one embodiment, the login monitor 110 displays the census information for viewing by the end user. The login monitor 110 may overlay a message on the login page, indicating the census information. For example, the login monitor 110 may notify the end user that the login page is suspicious because, according to the census information of the login page, no one or very few end users have logged in using the login page. A login page with no or relatively few previous logins is likely to be suspicious because a legitimate login page would have been employed by many end users to log into their online accounts. Also, a phishing login page would be detected sooner or later by the vast amount of computer security modules deployed on the Internet, and would be blocked or included in a blacklist at some point. Accordingly, a login page with zero or few logins is likely to be a newly deployed login phishing page. The login monitor 110 may be configured to warn the end user when the number of logins using the login page is less than a threshold.

Figure 4:
FIG. 4 shows a screen shot of a message window that includes census information in accordance with an embodiment of the present invention.
Figure 5:
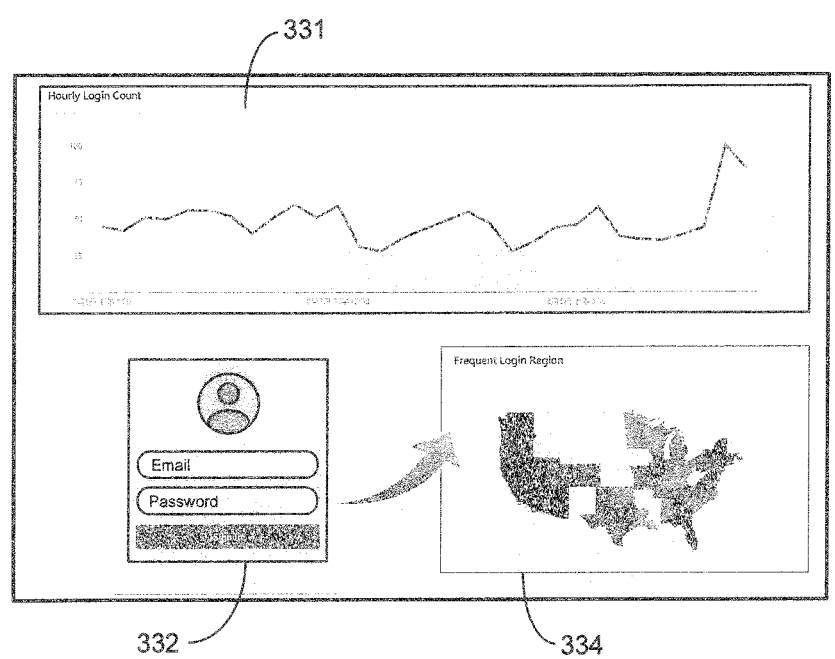
FIG. 5 shows example graphical representations of census information of a login page in accordance with an embodiment of the present invention.

A login monitor 110 may be configured to warn the end user of suspicious login pages, or simply display the census information to the end user. In the example screen shot of FIG. 4, the login monitor 110 displays the census information in a message window 321 that overlays the login form of a login page 320. In the example of FIG. 4, the end user is warned that no none has previously logged in using the login page 320 (at least based on current census information of the login page). As another example, the login monitor 110 may display a graphical representation of geographical locations of end users that previously logged in using the login page, the timestamps of when end users logged in using the login page, and other census information. FIG. 5 shows examples of graphical representations of census information of a login page 332, showing login statistics, such as an hourly login count (see 331) and a login frequency count by geographic location (see 334). As can be appreciated the census information of a login page allows the end user to make an informed decision whether or not to use the login page.

Figure 6:
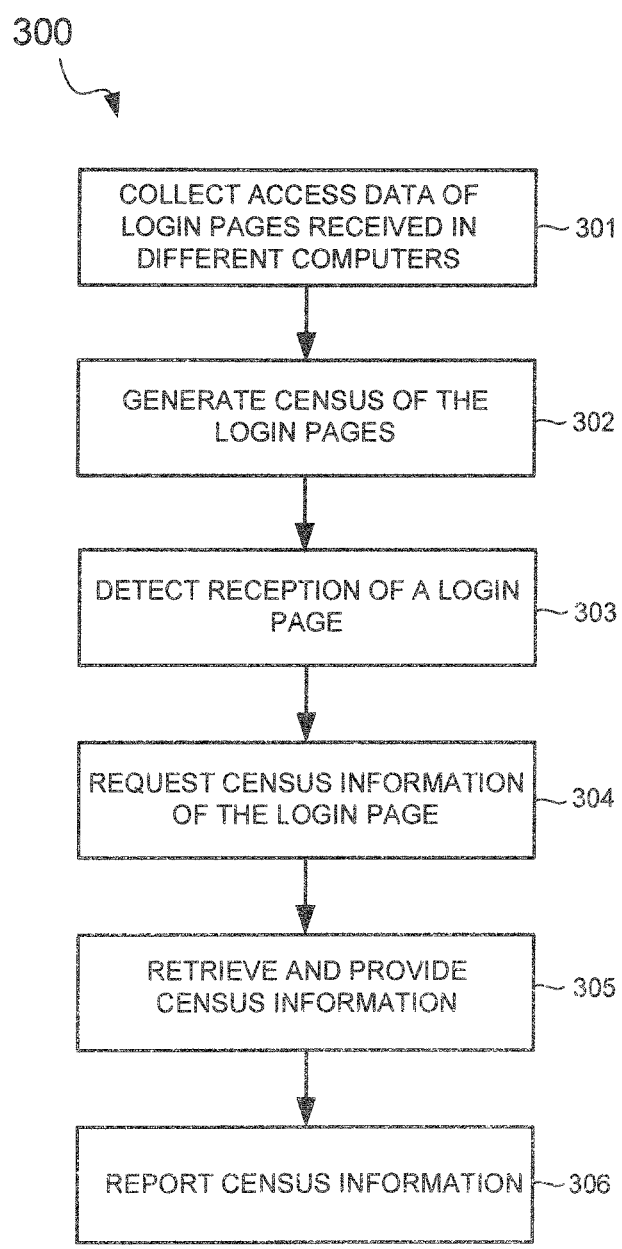
FIG. 6 shows a flow diagram of a method of detecting phishing in accordance with an embodiment of the present invention.

FIG. 6 shows a flow diagram of a method 300 of detecting phishing in accordance with an embodiment of the present invention. The method 300 is explained using the system 200 of FIG. 3 as an example. The method 300 may also be performed using other systems or components.

In the example of FIG. 6, the phishing detection system 220 collects login access data of login pages received in different computers of different end users (step 301). The phishing detection system 220 generates a census of the login pages (step 302). An end user computer 210 detects reception of a login page in an end user computer 210 (step 303) and, in response, sends a request to the phishing detection system 220 for census information of the login page (step 304). The phishing detection system 220 retrieves the census information from the census data store 221 and provides the census information to the end user computer 210 as a reply to the request (step 305). The end user computer 210 receives the census information from the phishing detection system 220, and reports the census information to the end user (step 306). The end user computer 210 may report the census information in a message window overlying the login page. The census information may be reported in numerical, graphical, or other format.

Methods and systems for detecting phishing have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting phishing comprising:
   detecting reception of a login page in an end user computer, the login page having a uniform resource locator (URL) that indicates a network location of the login page and a page identifier that uniquely identifies a content of the login page, wherein detecting the reception of the login page includes hashing the content of the login page to generate the page identifier;
   in response to detecting the reception of the login page in the end user computer, retrieving census information of the login page, the census information indicating a number of times the login page as identified by its page identifier has been received in different end user computers; and
   reporting the census information to an end user of the user computer to allow the end user to make an informed decision on whether or not to use the login page.

2. The method of claim 1, wherein reporting the census information to the end user of the user computer comprises:
   displaying a message window that indicates a number of different end users who employed the login page to log into their respective online accounts.

3. The method of claim 2, wherein the message window is displayed over the login page in a display monitor of the end user computer.

4. The method of claim 1, wherein reporting the census information to the end user of the user computer comprises:
   displaying the census information in graphical form in a display monitor of the end user computer.

5. The method of claim 1, wherein retrieving the census information of the login page comprises:
   receiving the census information from a phishing detection system that generates a census of different login pages.

6. The method of claim 5, further comprising:
   the end user computer providing the page identifier of the login page to the phishing detection system and requesting the census information from the phishing detection system;
   the phishing detection system consulting a census data store for the census information based on the page identifier of the login page; and
   the phishing detection system providing the end user computer the census information retrieved from the census data store.

7. The method of claim 1, wherein the census information indicates a number of different end users who employed the login page to log into their respective online accounts by geographic location.

8. The method of claim 1, wherein the census information indicates a number of different end users who employed the login page to log into their respective online accounts by timestamp.

9. A system for detecting phishing, the system comprising:
   a phishing detection system comprising one or more computers that comprise a memory and a processor, the phishing detection system being configured to generate a census of different login pages received in different computers of different end users, receive a request for census information of a login page and a page identifier that uniquely identifies a content of the login page, and retrieve the census information of the login page based on the page identifier from a census data store; and
   an end user computer comprising a memory and a processor, the end user computer being configured to receive the login page, send the request for the census information and the page identifier to the phishing detection system, receive the census information from the phishing detection system, and report the census information to an end user of the end user computer, the census information indicating a number of times the login page has been received in different end user computers, wherein the user computer is configured to hash the content of the login page to generate the page identifier.

10. The system of claim 9, wherein the end user computer reports the census information to the end user of the end user computer by displaying a message window that indicates a number of different end users who employed the login page to log into their respective online accounts.

11. The system of claim 10, wherein the end user computer displays the message window over the login page in a display monitor of the end user computer.

12. The system of claim 9, wherein the end user computer reports the census information to the end user of the end user computer by displaying the census information in graphical form in a display monitor of the end user computer.

13. The system of claim 9, wherein the phishing detection system generates the census information of the login page from login access data received from other end user computers.

14. A non-transitory computer-readable medium comprising instructions stored thereon, that when executed by a processor, perform the steps of:
   detecting reception of a login page in an end user computer, the login page having a uniform resource locator (URL) that indicates a network location of the login page and a page identifier that uniquely identifies a content of the login page, wherein detecting the reception of the login page includes hashing the content of the login page to generate the page identifier;
   in response to detecting the reception of the login page in the end user computer, retrieving census information of the login page, the census information indicating a number of times the login page as identified by its page identifier has been received in different end user computers; and
   reporting the census information to an end user of the user computer to allow the end user to make an informed decision on whether or not to use the login page.

15. The non-transitory computer-readable medium of claim 14, wherein reporting the census information to the end user of the user computer comprises:
   displaying a message window that indicates a number of different end users who employed the login page to log into their respective online accounts.

16. The non-transitory computer-readable medium of claim 14, wherein the message window is displayed over the login page in a display monitor of the end user computer.

17. The non-transitory computer-readable medium of claim 14, wherein reporting the census information to the end user of the user computer comprises:
   displaying the census information in graphical form in a display monitor of the end user computer.

18. The non-transitory computer-readable medium of claim 14, wherein retrieving the census information of the login page comprises:
   receiving the census information from a phishing detection system that generates a census of different login pages.

19. The non-transitory computer-readable medium of claim 14, wherein the instructions further perform the steps of:

requesting and receiving the census information from a phishing detection system over the Internet.

20. The non-transitory computer-readable medium of claim 14, wherein the census information indicates a number of different end users who employed the login page to log into their respective online accounts by geographic location.

\* \* \* \* \*